Sept. 2, 1924.
C. B. ROSE
1,507,518
CLUTCH MECHANISM
Filed March 30, 1920      2 Sheets-Sheet 1
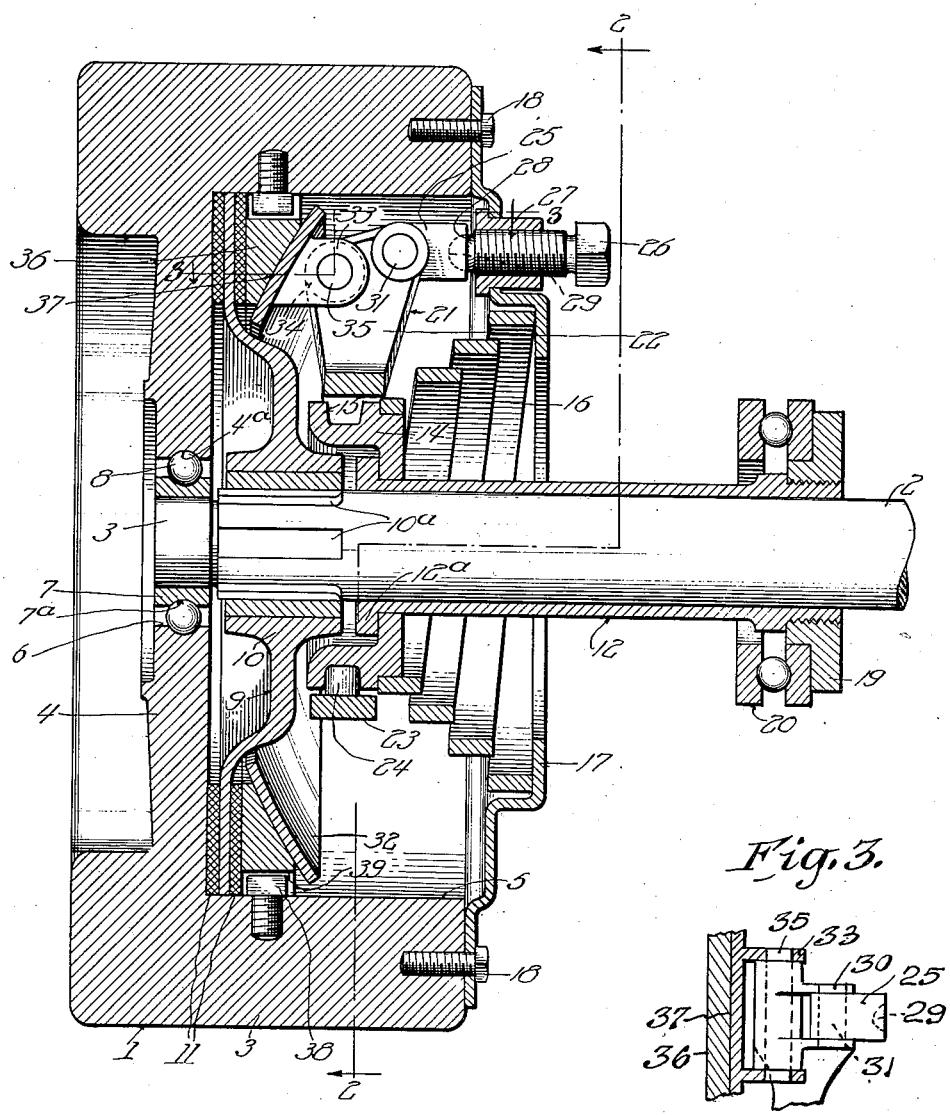
Inventor
Charles B. Rose Sept. 2, 1924.
C. B. ROSE
CLUTCH MECHANISM
Filed March 30, 1920
1,507,518
2 Sheets-Sheet 2
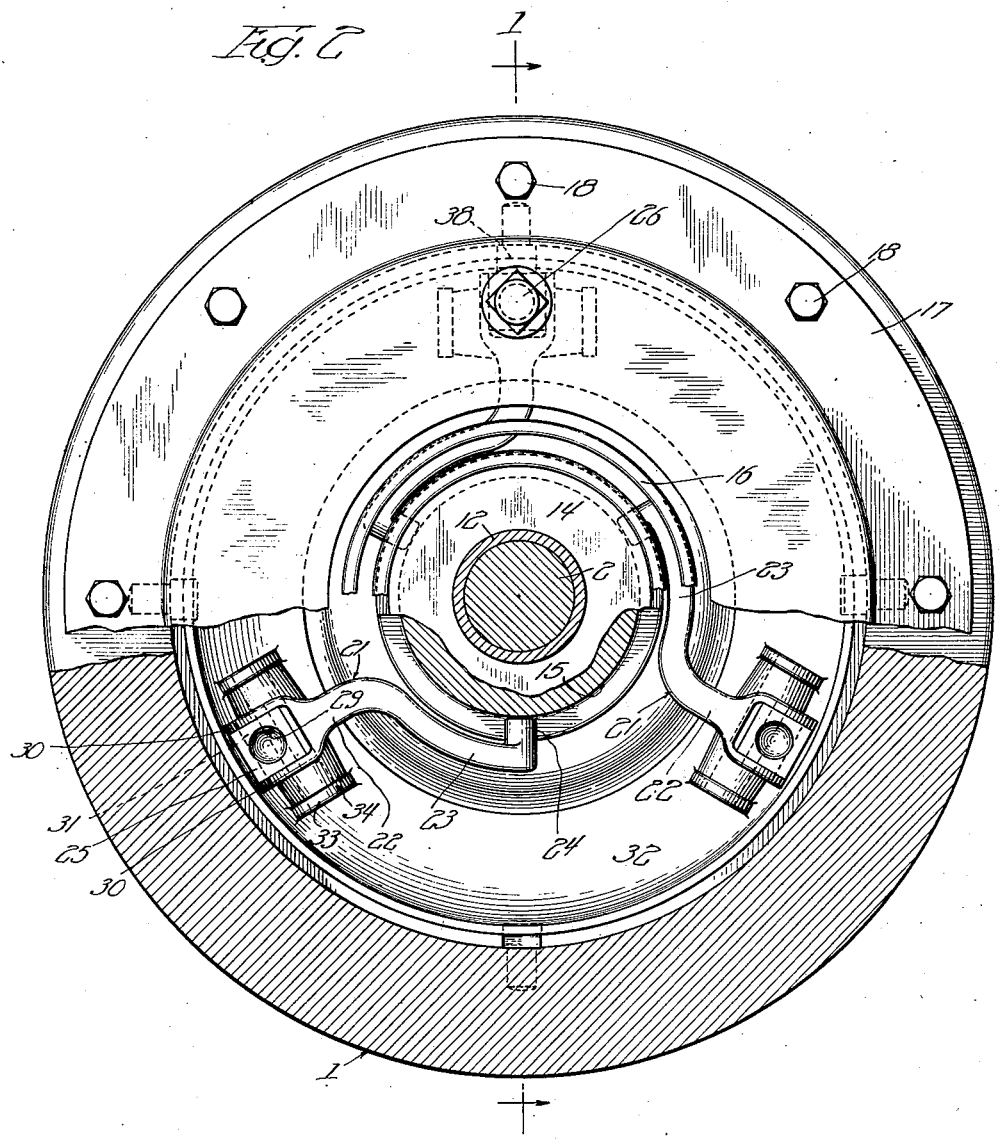
Inventor
Charles B. Rose Patented Sept. 2, 1924.

1,507,518

UNITED STATES PATENT OFFICE.

CHARLES B. ROSE, OF EAST MOLINE, ILLINOIS.

CLUTCH MECHANISM.

Application filed March 30, 1920. Serial No. 369,849.

*To all whom it may concern:*

Be it known that I, CHARLES B. ROSE, a citizen of the United States, and a resident of East Moline, in the county of Rock Island and State of Illinois, have invented certain new and useful Improvements in Clutch Mechanisms, of which the following is a specification.

This invention relates to improvements in clutch mechanisms, and more particularly to clutch mechanisms of that type ordinarily used in motor vehicles, tractors, and the like.

The object of my invention is to provide a construction for devices of the character described, embodying improved features of construction calculated to overcome certain disadvantages that exist in clutch mechanisms as ordinarily constructed. The novel features of construction pertain more especially to the clutch operating mechanism whereby the friction members are compressed and released in the act of "throwing in" or releasing the clutch. Owing to the constant wear of the parts, most clutches are provided with means of adjustment adapted to be manipulated by hand, from time to time, to compensate for or "take up" the wear in the friction members, which otherwise would lead to excessive lost motion and failure of the clutch to properly transmit power. These adjusting means ordinarily consist of a plurality of independently manipulated screws bearing indirectly upon the friction members at several points around the circumference thereof. The uniform adjustment of the screws is ordinarily difficult to maintain, and likewise a uniform pressure throughout the friction members, it being understood that the slightest inequality of pressure brings about unequal wear in the parts. In time there must of necessity develop numerous faults in the action of the clutch, which cannot be ordinarily rectified without premature replacement of the parts. The purpose of the invention is to provide an arrangement of clutch members such as will insure the constant pressure between the friction members, and automatically compensate for any inequality in the adjustments made. The essence of the invention is the introduction of self-alining members between the principal friction members and the source of pressure, the construction and arrangement of these members being hereinafter described in detail and in connection with the accompanying drawing wherein Figure 1 is a view in vertical section of a clutch mechanism embodying the features of the invention, taken on line 1, 1 of Figure 2, and Figure 2 is a view partially in elevation and partially in section, as taken on line 2, 2 of Figure 1.

Figure 3 is a section on the line 3—3 of Figure 1.

The clutch mechanism herein described and illustrated and embodying the features of the invention is located between the motor and the transmission mechanism of the motor vehicle power plant. The purpose and function of the clutch is too well known to be set forth in detail, it being understood that the clutch mechanism embodying the features of the invention performs the usual functions of devices of this character. The particular type of clutch herein illustrated and described is incorporated in the fly wheel of the motor, the clutch operating members being mounted upon the fly wheel and rotatable therewith.

The principal elements of the clutch mechanism embodied in my invention and the elements associated with the clutch mechanism and which are common to all devices of this character comprise, in general, a fly wheel 1, hereinafter designated as the driving member, said fly wheel being ordinarily considered as a part of the internal combustion motor and mounted upon the crank shaft thereof, and a driven shaft 2 terminating in close proximity to the fly wheel 1 and extending into the transmission casing of the power plant. In the particular construction herein illustrated, the fly wheel comprises a rim 3 and a central web 4, there being formed on one side of the web, namely, on that side facing in the direction of the driven shaft, a cavity 5 of considerable depth and diameter. The driven shaft extends axially into the cavity 5 with its end terminating within a central aperture 6 formed in the web 4 of the fly wheel. This end portion 3 carries a collar 7 provided with an annular groove or race 7ª, in which are mounted ball bearings 8 engaging a corresponding groove or race 4ª formed in the surface of the aperture 6 in the fly wheel web 4.

At the end of the driven shaft adjacent to the face of the web 4 of the fly wheel is mounted a friction plate 9 comprising a hub 10 engaging a plurality of keys 10ª formed on the shaft 2. The marginal portion of said plate extends between and is embraced by two friction disks 11, 11, the latter being loosely mounted within the cavity 5, one of said friction disks lying between the plate 9 and the face of the fly wheel web 4. The other friction disk has frictional contact with the plate 10 and is interposed between the same and other members associated with the clutch operating mechanism.

At this point it is to be observed that the driving member or fly wheel 1 is connected to and transmits power to the driven shaft through the medium of the co-acting friction surfaces of the clutch plate 9 carried by the driven shaft 2 and the friction disks 11, 11 interposed between said plate and the fly wheel 1, the frictional engagement or clutching action being effected by the application of pressure upon the disks, by means of a clutch spring, thereby increasing the frictional co-action to a degree sufficient to connect the driving and driven members, causing the same to rotate as a unit and effecting the transmission of power from the former to the latter.

Referring more in detail to the clutch operating mechanism whereby the pressure is applied to the friction disks in the act of connecting the driving and driven members together, and ordinarily known as "throwing in" the clutch, and likewise for relieving the pressure or releasing the clutch, this mechanism comprises parts as follows: Mounted upon the driven shaft and slidable longitudinally thereon is a sleeve 12, terminating at its inner end adjacent to the hub 10 of the clutch plate 9 and is provided with a short radial flange 12ª. Surrounding the inner end of the sleeve 12 and abutting against the shoulder formed by the flange 12ª is a collar or shifting ring 14 adapted to revolve upon the sleeve 12 and free to move endwise in a single direction, namely, toward the outer end of said sleeve. Formed in the outer annular surface of the collar 14 is a groove 15. A helical clutch spring 16 consisting of several turns of comparatively stout spring material gradually increasing in diameter from its inner to its outer extremities, surrounds the sleeve 12 adjacent to its inner end, said spring being partially enclosed within the cavity 5 of the fly wheel. The inner and smaller end of the spring 16 is suitably connected to the shifting ring 14. The outer end of the spring 16 bears against the inner face of the annular plate 17 which covers the open end of the fly wheel cavity 5 and is rigidly fixed to the fly wheel by means of cap screws 18 extending through the margin of the plate and anchored in the rim 3 of said fly wheel. The outer or opposite end of the sleeve 12 terminates exterior to the cavity 5 of the fly wheel and has mounted at said outer end members including a collar 19 and ball bearing 20, the collar being fixed to the sleeve 12 and the ball bearing 20 being interposed between said collar 19 and the members constituting the parts of the clutch releasing or "throw out" mechanism, ordinarily a foot-operated pedal known as the clutch pedal of a motor vehicle.

Describing now those parts of the clutch mechanism interposed between the shifting ring 14 and the co-acting friction members 9 and 11, the same comprise parts as follows: Mounted within the space surrounding the shifting ring 14 are a plurality of lever members 21, said levers being preferably three in number located at points spaced apart throughout angles of 120 degrees, each of said levers being constructed and operatively connected to other parts of the clutch operating mechanism in the following manner: The body portion 22 is disposed radially with relation to the shifting ring 14, said body portion terminating at its lower end in a curvilinear arm 23 (Figure 2) extending at right angles to the body member in a counter-clockwise direction. The curved arm 23 lies in close proximity to the periphery of the shifting ring 14 and extends throughout an arc of substantially 60 degrees. At the end of the arm 23 is provided a transverse finger or lug 24 extending radially inward and engaging the groove 15 of the shifting ring 14, said finger being preferably circular in cross section and slightly less in diameter than the width of the groove, thereby affording a sufficient amount of play between the shifting ring and each of the levers 21. Referring further to the body member 22 of the several levers 21, the same terminate at their outer ends adjacent to the fly wheel rim, said outer ends being slightly increased in width. Pivotally connected to each of the body members 22 and at a point adjacent to the plate 17 is an arm 25, each of said arms extending parallel to the driven shaft 2 and terminating at its free end adjacent to the plate 17. Mounted in the said plate 17 and in axial alinement with the arms 25 of the levers 21 are a corresponding number of adjustment screws 26, preferably having screw threaded engagement in bushings 27 mounted in said plate 17. The adjustment screws 27 are angularly spaced in the same manner as the levers 21, each bearing against the end of its associated tire circumference of the friction members, this being due primarily to the fact that no means are available for gauging the amount of adjustment undergone by the screws 26. By the presence of the alining plate 32 and ring 36 interposed between the toggle levers 21 and the several friction members, it is possible to automatically overcome and compensate for any discrepancy in the adjustment of the screws 26.

The manner in which the alining members 32 and 36 accomplish their purpose will be understood from the following: Assuming that one of the adjustment screws 26 is screwed inwardly a slightly greater distance than the remaining screws, it is at once evident that the pressure exerted through the toggle lever associated therewith upon the portion of the friction members adjacent thereto will be correspondingly greater. By reason of the radial displacement of the fixed pivot 31 and the moving pivots 35 of the toggle levers, the force transmitted to the friction members through the medium of the alining ring and plate is not along a line at right angles to the plane of contact between the friction disks and clutch plate 9, but rather along a line at right angles to the spherical contact surfaces at 37 of the said alining plate and ring 32 and 36, respectively. Now, resolving this force into its components, it is seen that one component acts horizontally, or in a line through the actual center of the moving pivots 35, and at right angles to the plane of contact of the friction disks 11 and clutch plate 9, and the other component acts radially, or at right angles to the horizontal component. Therefore, if the pressure applied by one of the toggle levers is greater than that applied through the remaining toggle levers, the radial components of the forces applied by the toggle levers tend to become equal and to restore the condition of equilibrium. This is automatically accomplished by the bodily shifting of the alining plate 32 along the plane of contact 37 toward the point at which the less force is acting until a position is reached where all the forces are equalized. In other words, the slight displacement of one of the fixed pivots 31 of the toggle levers is compensated, with the result that the pressure upon the friction disks is restored to a uniform amount in spite of any inequality in the adjustment of the screws 26. This equality is restored automatically by reason of the shifting or self-centering of the alinement plate 32 relative to the alining ring 36, this shifting movement being dependent upon the particular conformation of the contact surfaces of the alining members and the relation of the contact surface to the direction of application of the force exerted thereon by the toggle levers.

The results herein accomplished may obviously be obtained by modifying the features of construction described, without departing from the spirit of the invention. For this reason I do not wish to be limited as to the structure or application of the invention except in so far as specifically pointed out in the appended claims.

I claim as my invention:

1. In a clutch mechanism, the combination of a driving member, a driven member, friction members for connecting said driving and driven members, clutch operating mechanism operative to move said friction members into and out of clutching engagement, said mechanism including lever devices, and means interposed between said lever devices and the friction members for transmitting the pressure of the lever devices to the friction members, said means serving to automatically equalize the force exerted on said friction members by said lever devices.

2. In a clutch mechanism, the combination of driving and driven members, annular friction members mounted on said driving and driven members, clutch operating mechanism comprising a plurality of levers circumferentially disposed adjacent said friction members, a spring operatively connected to one end of said levers, the opposite ends of said levers being pivoted at points normally fixed, means for adjusting said fixed pivots, and alining means interposed between said levers and said friction members to transmit pressure from said levers to said friction members, said aligning means acting automatically to equalize the pressure applied to said friction members by said levers.

3. In a clutch mechanism, the combination of driving and driven members, co-acting friction members interposed between said driving and driven members, a clutch spring, clutch operating mechanism carried by one of said driving and driven members and acting to transmit the pressure of said spring to said friction members, and an alining member interposed between said operating mechanism and said friction members having bearing engagement with said friction members along a surface disposed at an angle to the plane of contact of said friction members, said alining member being radially shiftable relative to said friction members.

4. In a clutch mechanism, the combination of a driving member, a driven member, friction members mounted on said driving and driven members, clutch operating mechanism mounted on said driving member and comprising a clutch spring, a plurality of levers operatively connected with said spring, and an annular plate pivotally connected to said levers and having bearing engagement with said friction members, said plate having a surface disposed at an angle to the plane of contact of said friction memarm 25. The inner end of each screw is provided with a rounded or spherical head 28 fitting into a similarly shaped socket 29 formed in the end of the arm 25.

As a preferable construction, each of the levers is provided with two spaced ears 30 which embrace the inner end of each arm 25, and a pintle pin 31 extending through both ears and the arm 25, this pintle pin forming the fixed pivot of the levers, which, as will hereinafter be seen, have a toggle action.

On the opposite side of the levers 21 from the abutment or adjustment screws 26, is an annular plate or disk 32, hereinafter termed the alining plate, this plate being pivotally connected at three points to the three now designated toggle levers 21. On the rear face of the plate are provided pairs of integral ears 33, each pair embracing a hub 34 formed integral with each of the levers 21, the hub of each lever being disposed a short distance from the fixed pivot 31 and offset slightly from horizontal alinement with the adjustment screws in a radially inward direction. A pin or pintle 35 extends through the ears 33 and hub 34 and forms the moving pivot of the toggle levers 21.

Intermediate the alining plate 32 and the adjacent friction disk 11 is located an annular ring 36, this member being hereinafter designated as the alining ring. The alining plate 32 and ring 36 have bearing engagement with each other on complementary concave and convex bearing surfaces as at 37, and in reality are spherical and constitute a section of a sphere included between two parallel planes at right angles to the axis of rotation, said sphere being taken about a center located in the axis of rotation which coincides with the axis of the shaft 2. In sectional contour the plate 32 is of uniform thickness and is inclined at an acute angle to the axis of rotation and in a direction toward the web 4 of the fly wheel. Similarly, the alining ring 36 has a corresponding surface slightly concave, as before indicated, and in cross section presents a wedge shaped appearance. The alining ring is connected to and carried by the fly wheel by means of inwardly projecting lugs 38 which engage a plurality of transverse slots 39 formed in the periphery of the ring, said ring being thus capable of shifting movement toward and from the friction disks 11, 11.

The clutch mechanism herein described and the function of the members embodying the invention will be understood from the following: In the position of the parts as shown in the drawings, the clutch mechanism is in clutch-engaging position, wherein the clutch plate 9 of the driven shaft 2 is engaged by the friction disks 11, 11 through the medium of the pressure exerted thereon by the clutch spring 16 acting through the shifting ring 14, the toggle levers 21 and the alining plate and ring 32 and 36, respectively. In transmitting the pressure applied to the shifting ring 14 by the spring 16 the toggle levers function in the following manner: The toggle levers are rotated about the fixed pivots 31 by the forward movement imparted to the arms 23 of the levers which transmits a forward movement or pressure to the alining plate 32 forcing the same against the alining ring 36, which in turn transmits a compressive force to the friction disks 11, 11, thus frictionally gripping the clutch plate 9 between them.

In order to release the clutch mechanism, the "throw out" lever or foot pedal is operated through the medium of the ball bearing 20 and collar 19, to move the sleeve 12 in a direction away from the fly wheel 1, this movement effecting a like shifting movement of the shift ring 14 simultaneously compressing the clutch spring 16 and actuating the toggle levers in a direction to move the alining plate 32 away from the alining ring 36, thereby removing the compression from the friction disks.

Under conditions of normal adjustment of the parts, the fixed pivots 31 of the toggle levers maintain a predetermined position, namely, at equal distances from the plane of contact between the plate 9 and either of the friction disks 11. So long as this distance remains constant it is manifest that the pressure transmitted to the friction disks will be uniform throughout their entire circumference. As the life of the clutch is extended, the friction disks gradually become worn and as a result, it is necessary to decrease the distance between the fixed pivots 31 of the toggle levers and the plane of the frictional contact before mentioned in order to take up the lost motion or play. This would be accomplished by the adjustment of the screws 26. Thus, by screwing in the adjustment screws 26 a predetermined amount, the fixed pivot 31 of each toggle lever will be moved forward a corresponding distance. It is clearly apparent that unless each fixed pivot is adjusted throughout the same distance the uniformity of pressure exerted upon the friction members through the medium of the toggle levers must necessarily be destroyed, in other words, a greater pressure will be exerted upon the friction disks throughout that portion thereof adjacent to the toggle lever whose fixed pivot 31 is positioned closer to the plane of frictional contact than one or both of the remaining fixed pivots. In practice, it is admitted to be a difficult task to make an adjustment for increased wear and at the same time maintain a uniform transmission of pressure throughout the enbers, and capable of a limited shifting movement radially and relative to said friction members.

5. In a clutch mechanism, the combination of a driving member, a driven member, friction members mounted on said driving and driven members, clutch operating mechanism mounted on said driving member and comprising a clutch spring, a plurality of levers operatively connected with said spring, and an annular plate pivotally connected to said levers and provided with a bearing surface of spherical conformation engaging one of said friction members having a complementary bearing surface.

6. In a clutch mechanism, the combination of a driving and a driven member, frictional clutch members mounted on said driving and driven members, clutch operating mechanism comprising spring actuated levers acting to exert pressure upon said friction members, and alining members interposed between said operating mechanism and said friction members to transmit pressure from the operating mechanism to the friction members, said aligning members having complementary concave and convex bearing surfaces radially inclined to the plane of contact of said friction members, said alining members being capable of relative shifting movement.

7. In a clutch mechanism, the combination of driving and driven members, co-acting friction members mounted on said driving and driven members, clutch operating mechanism carried by said driving member and comprising a clutch spring, a plurality of levers operatively connected with said spring at one of their ends, each of said levers having a fixed pivot at its opposite end, an adjusting screw in abutting engagement with each of said levers for adjusting the position of said fixed pivot relative to said friction members, and an alining member connected with each of said levers and in bearing engagement with said friction members, said alining member being provided with a radially curvilinear bearing surface inclined to the plane of said friction members and capable of radial shifting movement relative thereto.

8. In a clutch mechanism, the combination of a driving member, a driven member, co-acting friction members mounted on said driving and driven members, clutch operating mechanism mounted on said driving member comprising a clutch spring, radially disposed levers operatively connected at their inner ends with said spring, and an alining plate pivotally connected to the outer ends of said levers adjacent the fixed pivots thereof, and an alining ring rotative with said driving member and interposed between said plate and friction members, said alining plate and ring having complementary bearing surfaces of spherical conformation and capable of relative shifting movement.

9. In a clutch mechanism, the combination of a driving member, a driven member, friction members mounted on said driving and driven members, clutch operating mechanism mounted on said driving member and comprising a clutch spring, a plurality of radially disposed levers pivoted at their outer ends at normally fixed points, a sleeve engaging the inner ends of said levers and shiftable axially by the tension of said spring, adjustment screws operative to adjust the position of said fixed pivots, an alining plate pivotally connected with said levers adjacent the fixed pivots thereof, and an alining ring interposed between said plate and friction members and in bearing engagement with said plate, said ring and plate having complementary bearing surfaces conforming to the surface of a sphere having its center on the axis of rotation of said driving member, and said plate being capable of radial shifting movement to compensate for variation in the relative position of the fixed pivots of the levers.

10. A clutch having a driving member, a driven member, means for operatively connecting and disconnecting said members including friction rings arranged for annular contact on surfaces removed substantially from the axis of rotation, mechanism for adjusting said means to compensate for wear, said connecting and disconnecting means including a self-aligning device located substantially the same distance from the axis of rotation as the surfaces of contact of the friction rings and serving to automatically equalize the contact between the friction rings for all operative adjustments of the adjusting mechanism.

11. A clutch having a driving member, a driven member, means for operatively connecting and disconnecting said members including friction members, and mechanism for adjusting said means to compensate for wear, said means including a self-aligning device located near the outer portions of the friction members and serving to automatically equalize the pressure on the friction members when the adjusting mechanism is adjusted.

12. A clutch having a driving member, a driven member, friction discs carried by said members, operating means for engaging and disengaging said friction discs including a plurality of levers, and self-aligning means between said levers and discs for transmitting pressure from the operating means to the friction discs, said self-aligning means serving to automatically equalize the pressure of the levers on said discs.

13. A clutch having a driving member, a driven member, friction discs carried by said members, operating means for engaging and disengaging said discs including a plurality of lever devices, means for adjusting said lever devices to vary their effective action, and self-aligning means between the levers and discs for transmitting pressure from the levers to the discs, said self-aligning means serving to automatically equalize the pressure of the levers on the discs for all operative adjustments of the adjusting means.

14. In an automotive clutch, a rotatable driving member, a rotatable driven member, friction discs having annular contact surfaces removed substantially from the axis of rotation of the clutch, clutch operating means for exerting pressure on said friction discs to engage their contact surfaces, and a self-aligning means located substantially the same distance from the axis of rotation as the surfaces of contact of the friction discs and serving to automatically equalize the pressure over the contact surfaces between the friction discs when they are engaged.

15. In an automotive clutch, a rotatable driving member, a rotatable driven member, friction discs for connecting said driving and driven members, pressure means for connecting said discs including members exerting pressure at points removed substantially from the axis of rotation of the clutch, and a self-aligning device operative between said pressure exerting members and the friction discs for equalizing the pressure over the co-acting surfaces of the friction discs.

16. In an automotive clutch, a driving member, a driven member, friction discs for connecting and disconnecting said members, a pressure ring for engaging the discs, a member in self-aligning contact with the pressure ring, and clutch operating means engaging the self-aligning member.

In witness whereof, I hereunto subscribe my name this 25th day of March, A. D., 1919.

CHARLES B. ROSE.